UNITED STATES PATENT OFFICE.

CARL RUMPFF, OF APRATH, NEAR ELBERFELD, PRUSSIA, GERMANY.

MANUFACTURE OF BROWN DYE-STUFF.

SPECIFICATION forming part of Letters Patent No. 257,243, dated May 2, 1882.

Application filed February 18, 1882. (Specimens.)

*To all whom it may concern:*

Be it known that I, CARL RUMPFF, residing at Aprath, near Elberfeld, in the Kingdom of Prussia and Empire of Germany, have invented a new and useful Improvement in Manufacturing Brown Dye-Stuff Suitable for Dyeing Wool and Silk in Fast and Brilliant Shades, of which the following is a specification.

My invention consists of the new observation that the sulphonic acids of betanaphthylamine, if treated with nitrous acid in a neutral or very weak acid solution, give valuable brown coloring-matters, soluble in water, which dye silk and wool in brown shades fast against soap and light, and which are distinguished by an immense dyeing-power.

It is a well-known fact that betanaphthylaminesulphonic acid, if treated with nitrous acid in an acid solution, yields diazonaphthalinesulphonic acid—a colorless body. If, however, the naphthylaminesulphonic acid is treated with nitrous acid in neutral or very slightly acid solution, (by preference in an acetic-acid solution,) amidoazonaphthalinesulphonic acid is formed, which, like all amidoazo compounds, is a dye-stuff.

In carrying out my invention I dissolve one hundred kilograms betanaphthylaminesulphonate of soda and fourteen kilograms nitrite of soda in eight hundred kilograms water, and add by and by so much of any acid (by preference acetic acid, one part acetic acid, nine parts of water) as will be found necessary to decompose the nitrite of soda. The solution gets immediately dark-brown colored, and the reaction is finished after one or two days' standing, after which time the coloring-matter may be either precipitated with diluted sulphuric or hydrochloric acid, or may also be obtained by evaporating the whole liquid to dryness.

In place of nitrite of soda, free nitrous acid may be brought in reaction with the solution of the naphthylaminesulphonic acid, and also, if one molecule of diazonaphthalinesulphonic acid is mixed with one molecule of betanaphthylaminesulphonic acid in a neutral solution, the brown coloring-matter is formed.

In place of betanaphthylamine, methylbetanaphthylamine may be used.

The different methods for preparing the betanaphthylaminesulphonic acids are well known. I, however, recommend as the best one that method founding upon heating betanaphthylamine with two to five parts of oil of vitriol at 60° to 150° centigrade. According to the temperature and the quality of oil of vitriol used, isomeric mono and di sulphonic acids are formed, which all give brown coloring-matters of different shades.

What I claim as new, and desire to secure by Letters Patent, is—

The brown coloring-matter formed by the reaction of nitrous acid upon the salts of the betanaphthylaminesulphonic acid in neutral or very slightly acid solution.

CARL RUMPFF.

Witnesses:
   J. FERD. KEDENBURG,
   HERM. KÖNIG.